United States Patent
Brosowsky et al.

(10) Patent No.: US 11,190,902 B1
(45) Date of Patent: Nov. 30, 2021

(54) SYSTEM AND METHODS FOR LARGE-SCALE AUTOMATED INDOOR MAP DATA GEOREFERENCING

(71) Applicant: Geo-Comm, Inc., St. Cloud, MN (US)

(72) Inventors: John Brosowsky, St. Cloud, MN (US); Steven Henningsgard, St. Cloud, MN (US); Marc Trinks, St. Cloud, MN (US); Patrick Melancon, St. Cloud, MN (US)

(73) Assignee: Geo-Comm, Inc., St. Cloud, MN (US)

( * ) Notice: Subject to any disclaimer, the term of this patent is extended or adjusted under 35 U.S.C. 154(b) by 0 days.

(21) Appl. No.: 17/094,545

(22) Filed: Nov. 10, 2020

Related U.S. Application Data

(60) Provisional application No. 62/933,778, filed on Nov. 11, 2019.

(51) Int. Cl.
*H04W 4/021* (2018.01)
*H04W 4/029* (2018.01)

(52) U.S. Cl.
CPC ........... *H04W 4/021* (2013.01); *H04W 4/029* (2018.02)

(58) Field of Classification Search
CPC .............................. H04W 4/021; H04W 4/029
See application file for complete search history.

(56) References Cited

U.S. PATENT DOCUMENTS

2019/0058965 A1* 2/2019 Cerchio ................ H04W 4/023

* cited by examiner

*Primary Examiner* — Kabir A Timory
(74) *Attorney, Agent, or Firm* — Moss & Barnett; Michael A. Bondi

(57) ABSTRACT

A method of large-scale automated indoor map data georeferencing. A building floorplan is received in a digital format. A non-georeferenced vector polygon building footprint is extracted from the building floorplan. A plurality of georeferenced vector polygons representing individual building footprints in a selected area is provided. The non-georeferenced vector polygon building footprint is compared to identify a matching georeferenced building footprint polygon. The building floorplan is rasterized and clipped to the extent of the building footprint polygon to form a clipped floorplan raster. Real-world geographic coordinates of the matched georeferenced vector polygon are applied to the clipped floorplan raster to form the georeferenced indoor map data.

16 Claims, 8 Drawing Sheets

Non-georeferenced floorplan 201

Detected building footprint polygon

Georeferenced building footprint polygons

Hand drawn floorplan  601

SYSTEM AND METHODS FOR LARGE-SCALE AUTOMATED INDOOR MAP DATA GEOREFERENCING

REFERENCE TO RELATED APPLICATION

This application claims priority to Provisional Applic. No. 62/933,778, filed on Nov. 11, 2019, the contents of which are incorporated herein by reference.

FIELD OF THE INVENTION

The invention relates generally to georeferencing. More particularly, the invention relates to large-scale automated indoor map data georeferencing.

BACKGROUND OF THE INVENTION

Geographic information systems are computer-based tools that analyze, store, manipulate and visualize geographic information, commonly embodied as digital maps. Traditional geographic information systems analyze, store, manipulate, and visualize outdoor features including but not limited to street centerlines, land parcels, address points, building footprints, natural features such as water bodies, and demographic data such as census blocks. More recently geographic information systems are merging with building information and facilities management systems for analyzing, storing, manipulating, and visualizing indoor spaces.

Commonly digital drawings of indoor spaces utilized by building information and facilities management systems are stored in non-georeferenced formats such as computer aided drawing files, PDF documents and raster images. For indoor maps to be usable in a geographic information system, drawings of indoor spaces must be converted into digital data formats supported by a geographic information system, and importantly features in the indoor drawing must be associated with real-world geographic coordinates on the face of the earth.

While some automated systems and methods exist for converting between geographic information system, computer aided drawing, PDF, and raster image digital file formats, processes for assigning geographic coordinates to drawings of indoor spaces are typically manual, slow, expensive, and human labor intensive.

Such processes commonly require human technicians to manually register indoor data into a geographic information system by first visually identifying the rooftop of the building in aerial imagery, moving the building drawing to this location, scaling the building drawing to be the same size as the rooftop, and rotating the building drawing to match the building orientation in aerial imagery.

However, with over 125 million buildings in the United States alone, manually geographically registering all floorplans to real-world coordinates in a geographic information system using manual processes could cost many billions of dollars, and is not feasible or sustainable over time as new buildings are constructed, existing buildings are modified, and old buildings are torn down.

At the same time, new technologies such as the Internet of Things (IoT) which can track thousands of sensors within a single building, and Next Generation 9-1-1 technologies capable of calculating indoor positions of 9-1-1 calls, are creating significant immediate demand for indoor maps in geographic information systems that cannot be met with traditional digital map data development processes and manual methods.

Accordingly, there is a present need for a system and method for automatically georeferencing buildings across large geographic areas including but not limited to all buildings in a city, county, region, state, or nation. This will reduce costs and decrease time required for importing indoor maps into geographic information systems.

In one embodiment, an indoor map data georeferencing appliance is described that connects to geographic information systems containing maps described in real-world geographic coordinates on the face of the earth such as latitude and longitude coordinates, and building information and facilities management systems containing drawings of indoor spaces described only in local units of measure such as feet, inches, meters, and centimeters. The appliance determines real-word coordinates for non-georeferenced floorplan drawings and converts the floorplans into digital map data formats readily consumable by geographic information systems and electronic mapping systems.

SUMMARY OF THE INVENTION

An embodiment of the invention is directed to a method of large-scale automated indoor map data georeferencing. A building floorplan is received in a digital format. A non-georeferenced vector polygon building footprint is extracted from the building floorplan. A plurality of georeferenced vector polygons representing individual building footprints in a selected area is provided. The non-georeferenced vector polygon building footprint is compared to identify a matching georeferenced building footprint polygon. The building floorplan is rasterized and clipped to the extent of the building footprint polygon to form a clipped floorplan raster. Real-world geographic coordinates of the matched georeferenced vector polygon are applied to the clipped floorplan raster to form the georeferenced indoor map data.

Another embodiment of the invention is directed to a large-scale automated indoor map data georeferencing system that includes a receiver module, an extraction module, a comparator module, a rasterizing module and a georeferencer module. The receiver module can receive a building floorplan in a digital format. The extraction module is capable of extracting a non-georeferenced vector polygon building footprint from the building floorplan. The comparator module is capable of comparing the non-georeferenced vector polygon building footprint to identify a matching georeferenced building footprint polygon in a plurality of georeferenced vector polygons representing individual building footprints in a selected area. The rasterizing module is capable of rasterizing and clipping the building floorplan to the extent of the building footprint polygon to form a clipped floorplan raster. The georeferencer module is capable of applying real-world geographic coordinates of the matched georeferenced vector polygon to the clipped floorplan raster to form the georeferenced indoor map data.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

FIG. 4 401, 402, 403, 404 depict exemplary georeferenced building footprints extracted from georeferenced aerial imagery.

FIG. 5 503, 504, 505 depict the notional assignment of building corner coordinates from the best matched georeferenced building footprint 502 of a larger set of georeferenced building footprints 501 to a non-georeferenced building footprint polygon extracted from a floorplan PDF document 506.

FIG. 6 601 depicts a hand drawn floorplan that may not be accurate or precise and may contain significant error.

DETAILED DESCRIPTION OF THE INVENTION

Figure 1:
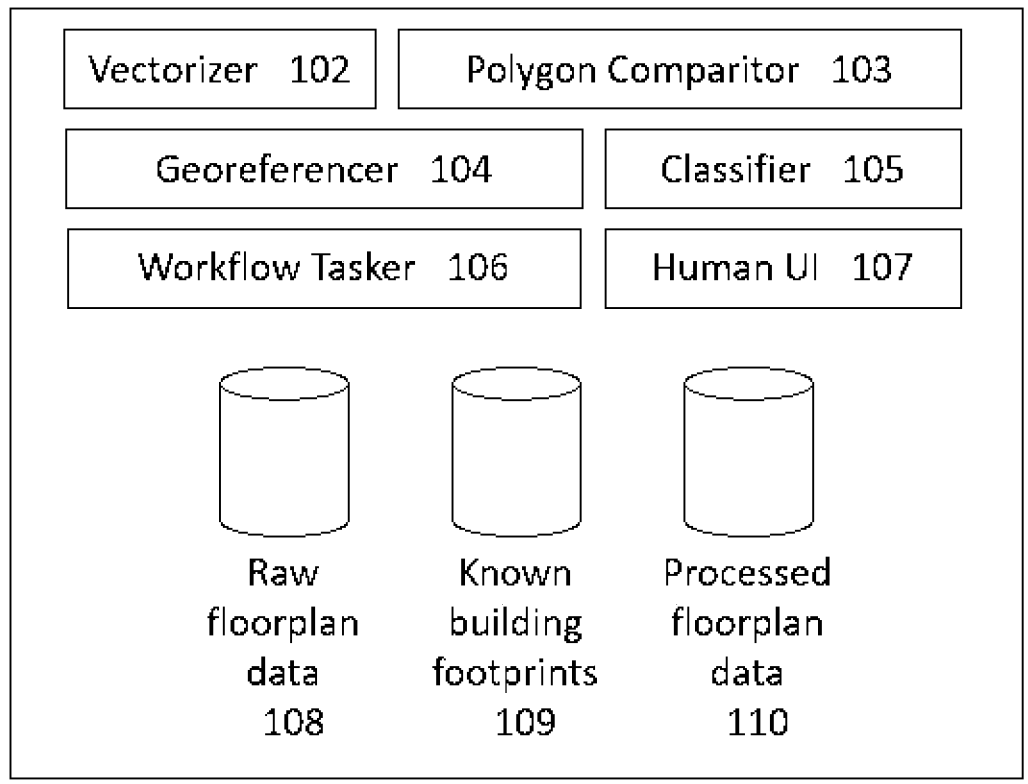
FIG. 1 depicts the georeferencing appliance and its major functional elements. The vectorizer 102 is used to extract geometric information such as a building footprint polygon from input floorplan documents. The polygon comparator 103 matches the shape of the extracted polygon to an existing georeferenced building footprint polygon. The georeferencer 104 applies real-world geographic coordinates to the input floorplan and converts it to a geographic information systems file format. The classifier 105 rates indoor maps based on suitability for conversion to GIS, for example hand drawn maps receive a low rating while architectural grade documents receive a high rating. 106 depicts a workflow tasker than can queue tasks for a human user or groups of human users to provide verification of automated processes, as well as to assist machine automation in cases of low-quality input floorplan documents. 107 depicts the human user interface functional element that connects human users to the workflow tasker. 108 is a datastore used by the appliance to store input floorplans that may be received from a building information management system, building owner or manager. 109 is a datastore used by the appliance to store existing georeferenced building footprint polygons such as those extracted from aerial imagery. 110 is a datastore used by the appliance for containing floorplan maps that have been converted into geographic information systems formats.
Figure 2:
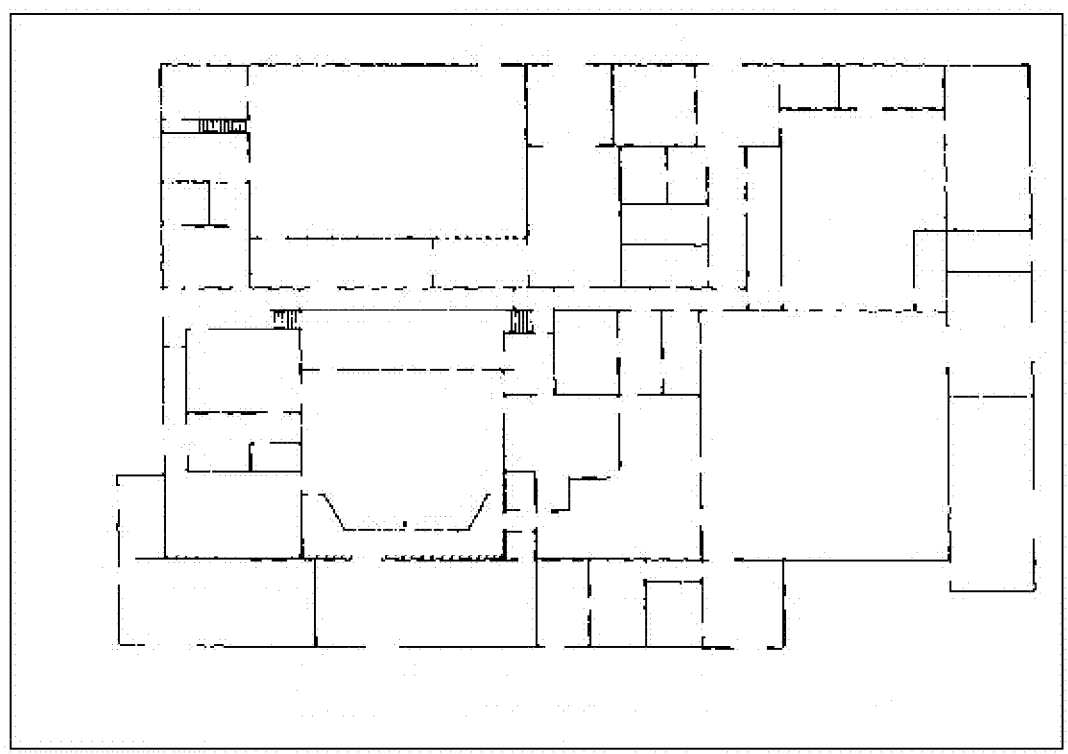
FIG. 2 depicts an exemplary non-georeferenced floorplan 201 such as may be received from a building owner in a common document exchange format such as PDF, or raster image format such as TIFF.
Figure 3:
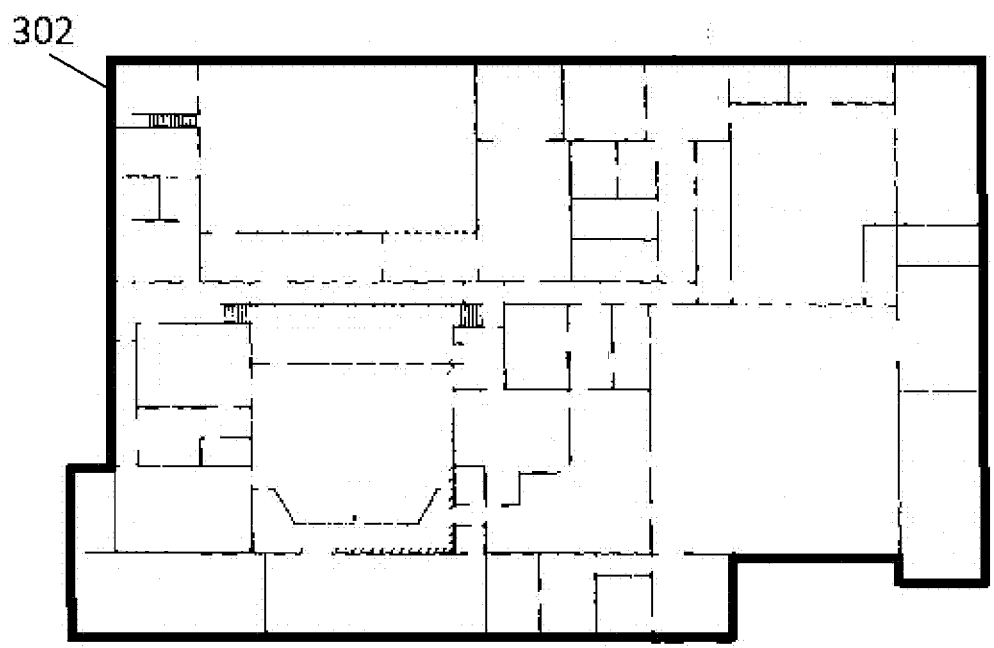
FIG. 3 depicts a polygon geometry 302 that has been extracted from the input floorplan PDF document. The thick black line around the outside of the floorplan is the extracted polygon geometry.
Figure 4:

A georeferencing appliance 101 is configured to receive floorplan documents 801 in digital formats from a building information management system or obtained from a building owner or manager in common computer aided drawing formats such as AutoCAD DWG/DEF., raster image formats such as TIFF and JPEG, or common document transfer formats such Adobe PDF 201. The floorplan documents include details on the shape and location of structures within the building such as walls.

The georeferencing appliance is provisioned with a set of georeferenced vector polygons 802 representing individual building footprints 109 within a geographic area such as a city, county, region, state, or nation. The georeferenced building footprints may be automatically extracted from aerial or satellite imagery, unmanned aerial vehicle or drone collected imagery and sensor data, and/or light detection and ranging systems, using well known existing feature extraction methods.

One example of a set of georeferenced building footprints 401 is the Microsoft Building Footprint database created by Microsoft in 2018 using automated methods to recognize building pixels in aerial imagery and polygonization methods to convert building pixel blobs into polygons. The Microsoft Building Footprint database contains over 125 million georeferenced building footprint polygons within the continental United States.

Potentially more accurate and precise georeferenced vector building footprints may be created using Esri ArcGIS Pro feature extraction and image analysis deep learning tools against locally captured higher resolution aerial imagery. Georeferenced building footprints may also be created manually by human technicians digitizing vector polygons over aerial imagery.

The georeferencing appliance utilizes a vectorizer mechanism 102 to create a non-georeferenced vector polygon building footprint 302 for each floorplan document obtained from a building information management system, building owner or manager 803. In one embodiment, the vectorization may be accomplished using common raster to vector conversion techniques.

In another embodiment, the vectorization may be accomplished using machine vision and object detection technologies including but not limited to OpenCV, an open source computer vision library. In still another embodiment the vectorization may be accomplished via training an algorithm using common machine learning techniques. In an additional embodiment the vectorization may be accomplished using a human workflow automation tasking system such as the Amazon Mechanical Turk system for performing discrete on-demand tasks.

In some cases, source floorplan documents such as CAD drawings and PDFs exported from computer aided drawing or other engineering software will already contain vector features. In these cases, the vectorizer mechanism will detect presence of existing vector features in submitted floorplan documents and utilize the existing vector geometries in subsequent processing. These techniques may be used individually or in combination to provide optimal building footprint polygon detection.

The georeferencing appliance may further be configured to support structured floorplan inputs. For example, a college, business, industrial, or government campus may have a designated floorplan standard to which all digital floorplans for buildings on the campus must adhere. In another example an entity such as a 9-1-1 authority using the georeferencing appliance to gather and process indoor map data across their service area may require that all submitted floorplan documents conform to a data structure standard.

In still another example a vendor of 9-1-1 call handling equipment and/or computer aided dispatch systems may utilize the georeferencing appliance to gather and process indoor maps for its customers and may require standardized structured data input formats. In these cases, the georeferencing appliance may be configured to recognize structured data features in floorplans instead of using unstructured data object detection and feature extraction methods.

The georeferencing appliance may also be configured to reject submitted floorplan documents not conforming to the input data structure standard and may provide quality assurance reports describing specific deficiencies in floorplan documents back to a submitter.

The georeferencing appliance then utilizes a polygon comparator mechanism 103 for matching each non-georeferenced building footprint polygon to the most similar shaped georeferenced building footprint polygon 804. Before attempting a match based on polygonal geometric shape congruence, the polygon comparator may first select a subset of georeferenced building footprints to assess for matching.

Decreasing the number of potential match candidates reduces risk of incorrect matching and increases overall process speed. Criteria for including a georeferenced building footprint in the subset may include known geographic attributes of the georeferenced building footprint such as address, city, county, region, state, or nation that the non-georeferenced building footprint is known to be nearby or contained within.

In one embodiment the polygon comparator may examine major and minor angles between vertices in the georeferenced and non-georeferenced footprints to determine matches. Area in square units of measure may also be utilized for matching in cases where area of a non-georeferenced building footprint can be computed.

In another embodiment the polygon comparator may use a human workflow automation tasking system such as the Amazon Mechanical Turk system for performing discrete on-demand tasks. These techniques may be used individually or in combination to provide optimal polygon matching.

Figure 5:
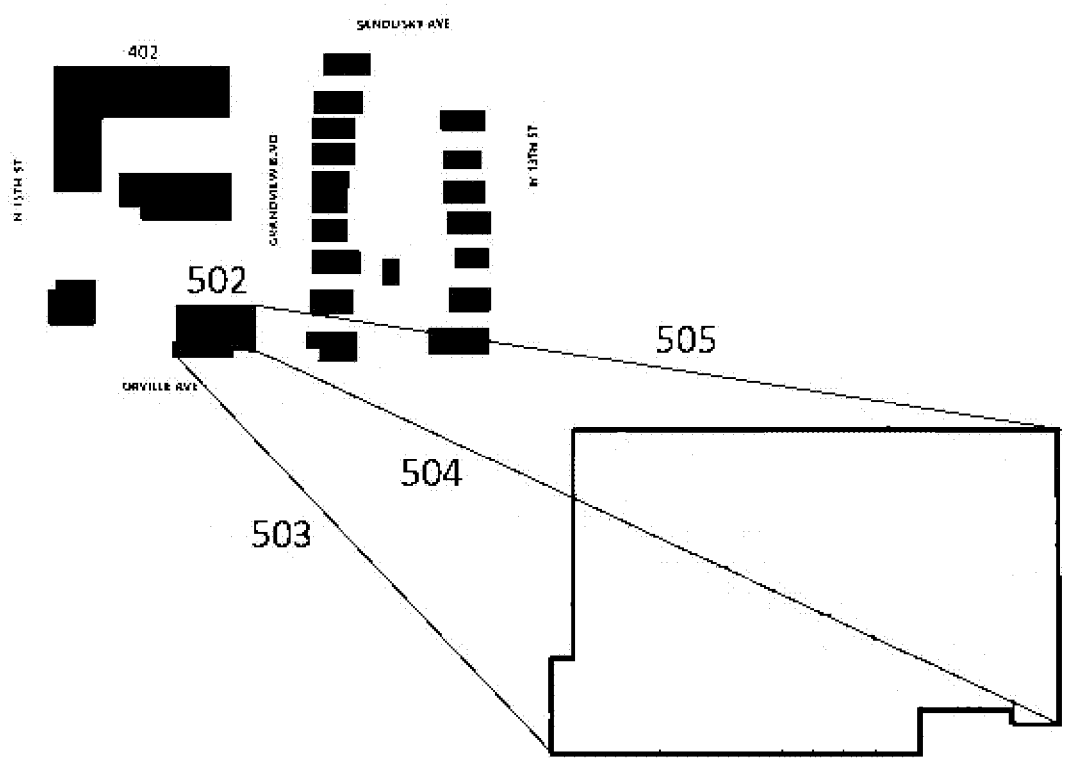
Figure 6:
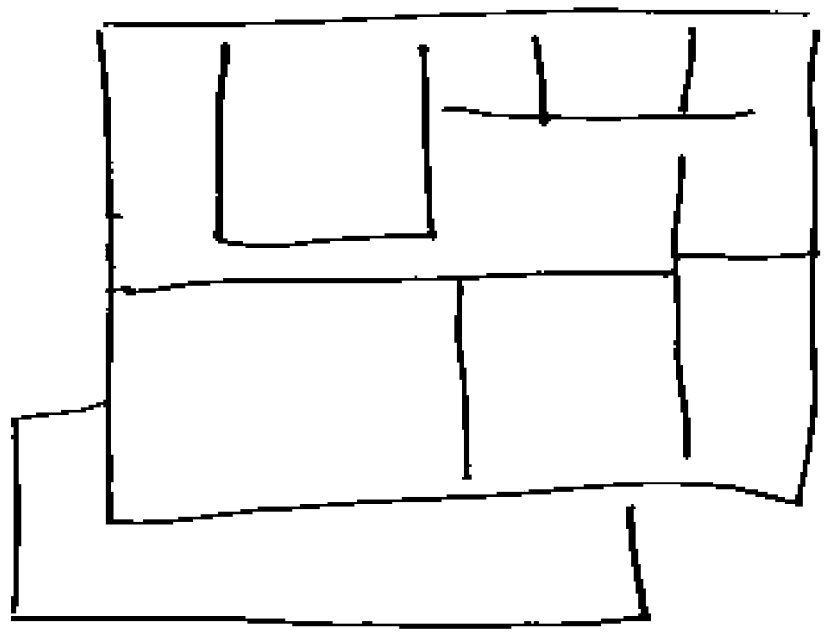
Figure 7:
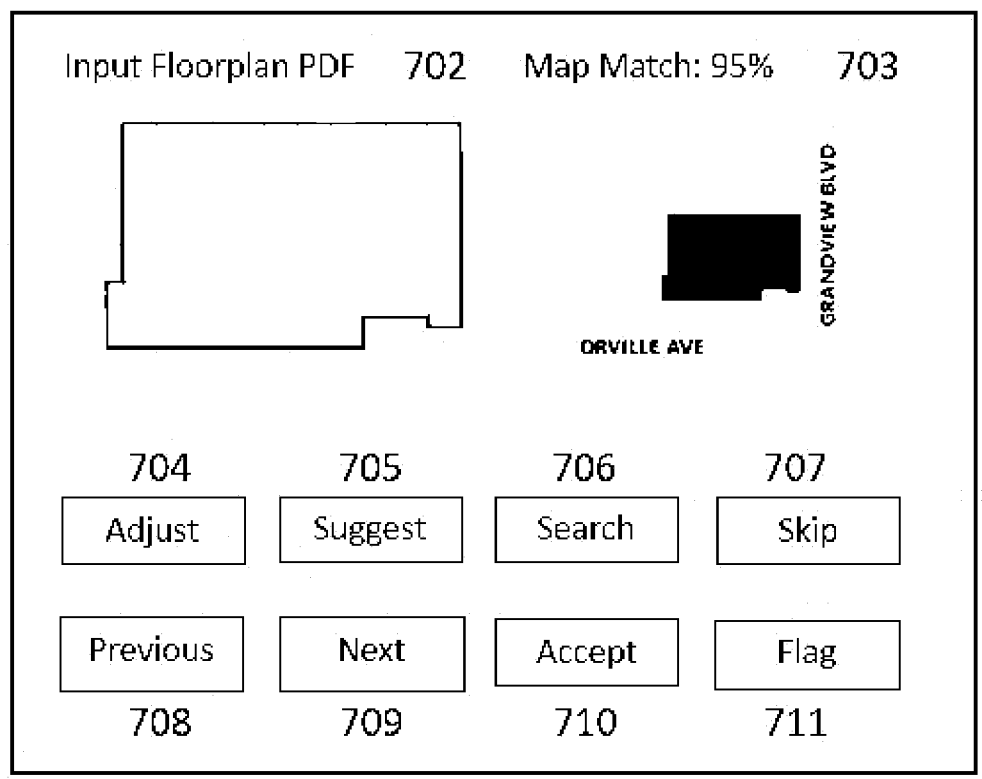
FIG. 7 depicts a workflow tasking human user interface 701. The diagram is not meant to describe an actual human user interface design in a software application, but rather is meant to describe the necessary functional elements in which a human must participate. 702 depicts an input floorplan in PDF format. 703 depicts that best matching georeferenced building footprint determine by the appliance mechanisms, including data describing the match quality. 704 depicts an adjustment option that a human user may utilize to improve the automated polygon extraction from a non-georeferenced building footprint. 705 depicts an option for a human user to select a different potential matched georeferenced building footprint. 706 depicts a search function, whereby a human user can query and search the exiting map in order to make improvements to the automated building footprint geographic coordinate assignments. 708 and 709 importantly represent a workflow tasking and queuing system where one or more human users may rapidly iterate through a set of multiple input floorplan documents and recommend geographic conversions. 710 represents a human approval of a georeferencing task. 711 depicts a method for a user to flag a georeferencing task for further examination later by the same or different human users.
Figure 8:
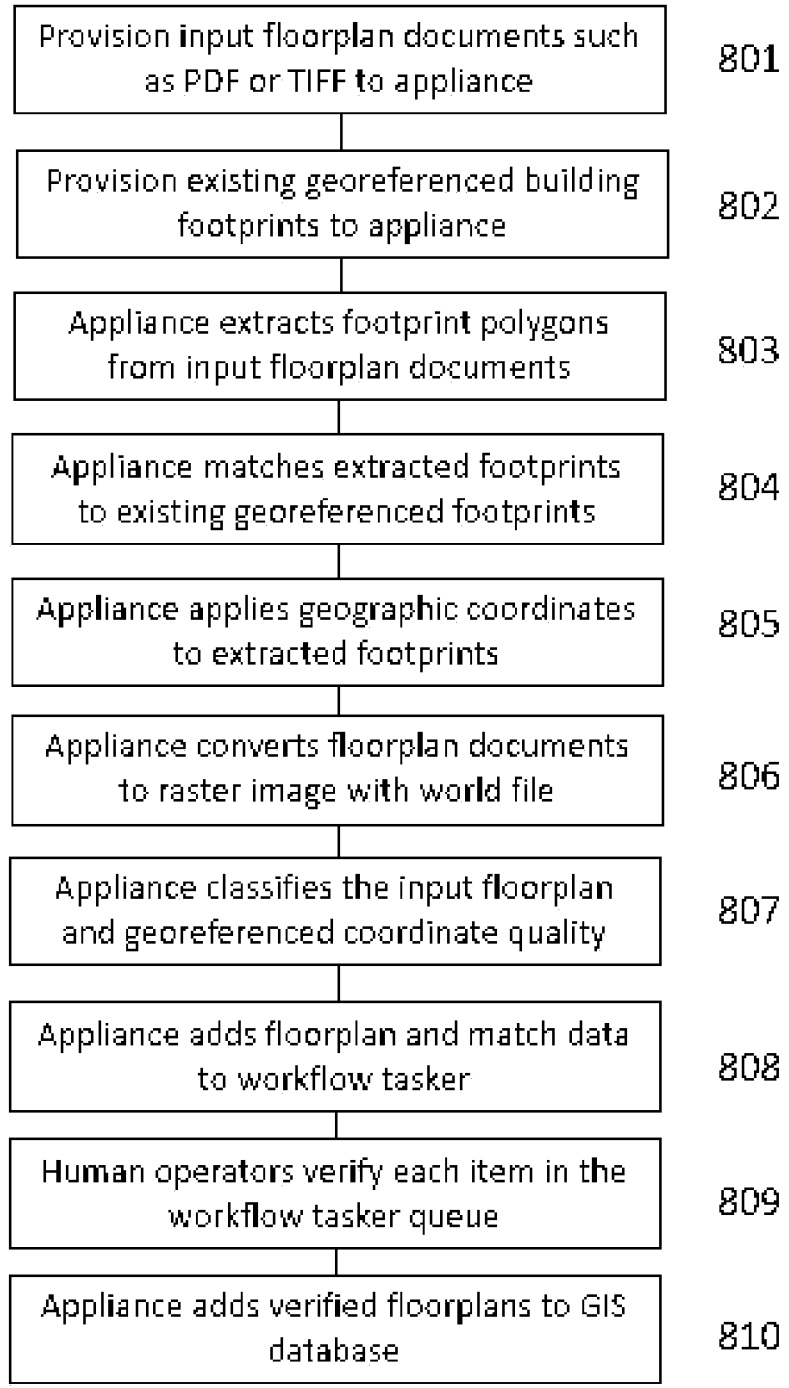
FIG. 8 depicts the overall start to finish process implemented by the georeferencing appliance.

The georeferencing appliance then utilizes a georeferencer mechanism 104 to apply real-world coordinates from the matched georeferenced polygon to the non-georeferenced building footprint polygon extracted from the source floorplan documents FIG. 5. Real-world coordinates may be expressed in geographic coordinate systems that span the entire globe such as including but not limited to latitude/longitude coordinates. Alternatively, real-world coordinates may be expressed in projected coordinate systems that are localized to minimize distortion in a known geographic region such as including but not limited to Universal Transverse Mercator or State Plane coordinates.

The georeferencer then rasterizes indoor floorplans and clips them to the extent of the building footprint polygon. The georeferencer applies the matched the real-world geographic coordinates to the clipped floorplan raster in the form of a world file that is a plain text file commonly used by geographic information systems for georeferencing raster map images 804. Alternately, the georeferencer may embed the georeferencing information into the raster image file itself, such as by following the public domain standard GeoTIFF format.

The georeferencer mechanism may be extended with a raster to vector conversion system to convert pixels denoting interior building structure such as rooms and corridors into geographic vector polygons using common raster to vector conversion techniques. In one embodiment, the raster to vector conversion may be accomplished using machine vision technologies including but not limited to OpenCV, an open source computer vision library.

In still another embodiment the raster to vector conversion may be accomplished via training an algorithm using common machine learning techniques. The raster to vector conversion system may further employ an optical character recognition component to convert text in the raster image into ASCII text characters associated with each converted geographic feature, such as a room name and number associated with a room polygon in a floorplan.

In an additional embodiment the raster to vector conversion may be accomplished using a human workflow automation tasking system such as the Amazon Mechanical Turk system for performing discrete on-demand tasks. These techniques may be used individually or in combination to provide optimal object detection.

The georeferencing appliance may include a workflow tasker 106 and human user interface 107 that automatically presents a human user with each floorplan georeferenced by the appliance for review and approval 808. A design for the human user interface is not included herein, but the required functional method is described.

The human user interface presents both the suggested matched georeferenced footprint 703 and non-georeferenced footprint 702, additional geographic data such as aerial or satellite imagery, and data about the quality of match via numeric and or textual indicators 703 to the human user.

Based on examination of the presented match data, importantly the user may quickly accept the recommended georeferencing match 710, or flag as a floorplan to examine manually later 711 by the same or different human users, and then advance to the next georeferenced floorplan in the workflow tasker queue that is pending approval 709. In this manner small teams of human users can accomplish georeferencing of large numbers of floorplans in a small amount of time.

Additional functions performed by a human user can include manually improving the footprint, feature and text extraction from input floorplan data 704, adjusting automatically selected georeferenced coordinates, asking the system to provide alternative possible matches 706, and searching and querying an existing map display 707.

The georeferencing appliance may include a classifier mechanism 105 that examines a received floorplan document such as a PDF floorplan and assigns a class ranking based on suitability of the floorplan document for automated processing 807.

For example, a PDF generated from architectural or construction plan documents 201 may be classified with a high automation suitability ranking, and a floorplan sketched by hand 601 may be classified with a low automation suitability ranking.

The classifier mechanism may employ a machine learning algorithm trained based on a set of indoor map documents classified by human workers. The georeferencing appliance may utilize automation suitability rankings to direct low-ranking floorplans to the human user interface workflow tasker for manual processing and human intervention.

In another embodiment the workflow tasker directs work to specifically trained groups of human users. For example, one group of human users may specialize in working with hand-drawn floorplan documents. Another group of human users may specialize in examining unmatched and/or flagged building footprints.

The georeferencing appliance may be coupled with a floorplan receiver mechanism. The floorplan receiver provides a convenient way for building information management systems, building owners and managers to submit floorplan documents to the georeferencing appliance. In one embodiment the floorplan receiver is an FTP or SFTP site to which floorplan documents may be uploaded. In another embodiment the floorplan receiver mechanism is email.

In still another embodiment the floorplan receiver is a web interface that a submitter must log into using a user name and password, and where the submitter can view processing status of their submitted floorplans, quality reports about their floorplans generated by the georeferencing appliance, add additional textual attributes about each floorplan, and send floorplan updates as buildings are added, demolished, or altered.

In addition to outputting georeferenced floorplan maps in common GIS data file formats 810, the georeferencing appliance may be coupled with a geographic information system web service hosting and serving system, in order to provide live web service access to georeferenced floorplan maps. Web service formats supported in this configuration include Esri ArcGIS raster tile, vector tile, and feature layer services. The configuration also supports Open GIS Consortium web map services, web feature services, and web map tile services.

In one embodiment the georeferencing appliance is a solid-state computing device with a system implemented in firmware including an embedded operating system. In another embodiment the georeferencing appliance is a common off the shelf server or personal computer running an operating system such as Linux or Microsoft Windows.

In still another embodiment the georeferencing appliance may be virtualized or containerized and operated from cloud computing systems such as Amazon AWS or Microsoft Azure. The georeferencing appliance may utilize graphics processing units (GPUs) or field programmable gate arrays (FPGAs) to increase the number of processors used for object detection and pattern matching in order to increase speed and accuracy of automated processes. Work may be balanced across multiple georeferencing appliances in order to support very large floorplan throughput requirements.

In the preceding detailed description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The preceding detailed description, therefore, is not to be taken in a limiting sense, and the scope of the present invention is defined by the appended claims.

It is contemplated that features disclosed in this application, as well as those described in the above applications incorporated by reference, can be mixed and matched to suit particular circumstances. Various other modifications and changes will be apparent to those of ordinary skill.

The invention claimed is:

1. A method of large-scale automated indoor map data georeferencing comprising:
   receiving a building floorplan in a digital format;
   extracting a non-georeferenced vector polygon building footprint from the building floorplan;
   providing a plurality of georeferenced vector polygons representing individual building footprints in a selected area in which a building corresponding to the building floorplan is located;
   comparing the non-georeferenced vector polygon building footprint to identify a matching georeferenced vector polygon building footprint that corresponds to the building floorplan;
   rasterizing and clipping the building floorplan to the extent of the building footprint polygon to form a clipped floorplan raster; and
   applying real-world geographic coordinates of the matched georeferenced vector polygon building footprint to the clipped floorplan raster to form a georeferenced indoor map data.

2. The method of claim 1, wherein the building floorplan comprises a building footprint and at least one structure at least partially inside of the building footprint.

3. The method of claim 1, wherein the georeferenced vector polygons representing individual building footprints are extracted from at least one of aerial or satellite imagery.

4. The method of claim 1, and further comprising vectorizing the building floorplan to form a non-georeferenced vector polygon building footprint.

5. The method of claim 1, wherein vectorization is accomplished using at least one of raster to vector conversion, machine vision and object detection or a training algorithm.

6. The method of claim 1, and further comprising selecting a subset of georeferenced vector polygons representing individual building footprints to assess for the comparing.

7. The method of claim 1, wherein the comparing the non-georeferenced vector polygon building footprint comprises examining major and minor angles between vertices in the georeferenced building footprint and the non-georeferenced building footprint.

8. The method of claim 1, and further comprising conducting a raster to vector conversion of pixels denoting interior building structures into geographic vector polygons.

9. The method of claim 1, and further comprising automatically presenting a user with the matched georeferenced building footprint and the recommended georeferencing matching georeferenced building footprint for review and approval.

10. The method of claim 1, and further comprising:
    classifying the received building floorplan based upon suitability for automated processing; and
    based upon the classification, directing the selected building floorplan for handling by human users.

11. A large-scale automated indoor map data georeferencing system comprising:
    a receiver module that is capable of receiving a building floorplan in a digital format;

an extraction module that is capable of extracting a non-georeferenced vector polygon building footprint from the building floorplan;

a comparator module that is capable of comparing the non-georeferenced vector polygon building footprint to identify a matching georeferenced vector polygon building footprint in a plurality of georeferenced vector polygons representing individual building footprints in a selected area in which a building corresponding to the building floorplan is located;

a rasterizing module that is capable of rasterizing and clipping the building floorplan to the extent of the building footprint polygon to form a clipped floorplan raster; and a georeferencer module that is capable of applying real-world geographic coordinates of the matched georeferenced vector polygon building footprint to the clipped floorplan raster to form a georeferenced indoor map data.

12. The large-scale automated indoor map data georeferencing system of claim 11, and further comprising a vectorizer module that is capable of preparing a non-georeferenced vector polygon building footprint of the building floorplan.

13. The large-scale automated indoor map data georeferencing system of claim 11, and further comprising a classifier module that classifies the received building floorplan upon suitability for automated processing and based upon the classification directs the selected building floorplan for handling by human users.

14. The large-scale automated indoor map data georeferencing system of claim 11, and further comprising a filter module that is capable of selecting a subset of georeferenced building footprints to assess for matching.

15. The large-scale automated indoor map data georeferencing system of claim 11, wherein the comparator module is capable of examining major and minor angles between vertices in the georeferenced building footprint and the non-georeferenced building footprint.

16. The large-scale automated indoor map data georeferencing system of claim 11, wherein the rasterizing module is capable of conducting a raster to vector conversion of pixels denoting interior building structures into geographic vector polygons.

* * * * *